March 15, 1966  W. A. STUTSKE  3,240,582
METHOD FOR FORMING AND DELIVERING GLASS
Filed June 29, 1962  13 Sheets-Sheet 1

INVENTOR.
WILLIAM A. STUTSKE
BY E. J. HOLLER &
W. A. SCHAICH
ATTORNEYS

March 15, 1966   W. A. STUTSKE   3,240,582
METHOD FOR FORMING AND DELIVERING GLASS
Filed June 29, 1962   13 Sheets-Sheet 3

INVENTOR.
WILLIAM A. STUTSKE
BY
E. J. HOLLER &
W. A. SCHAICH
ATTORNEYS

March 15, 1966 W. A. STUTSKE 3,240,582
METHOD FOR FORMING AND DELIVERING GLASS
Filed June 29, 1962 13 Sheets-Sheet 4

INVENTOR.
WILLIAM A. STUTSKE
BY E. J. HOLLER &
W. A. SCHAICH
ATTORNEYS

March 15, 1966 W. A. STUTSKE 3,240,582
METHOD FOR FORMING AND DELIVERING GLASS
Filed June 29, 1962 13 Sheets-Sheet 5

INVENTOR.
WILLIAM A. STUTSKE
BY E. S. HOLLER &
W. A. SCHAICH
ATTORNEYS

March 15, 1966 W. A. STUTSKE 3,240,582
METHOD FOR FORMING AND DELIVERING GLASS
Filed June 29, 1962 13 Sheets-Sheet 7

INVENTOR.
WILLIAM A. STUTSKE
BY E. J. HOLLER &
W. A. SCHAICH
ATTORNEYS

March 15, 1966      W. A. STUTSKE      3,240,582
METHOD FOR FORMING AND DELIVERING GLASS
Filed June 29, 1962      13 Sheets-Sheet 8

INVENTOR.
WILLIAM A. STUTSKE
BY E. J. HOLLER &
W. A. SCHAICH
ATTORNEYS

March 15, 1966 W. A. STUTSKE 3,240,582
METHOD FOR FORMING AND DELIVERING GLASS
Filed June 29, 1962 13 Sheets-Sheet 9

INVENTOR.
WILLIAM A. STUTSKE
BY E. S. HOLLER &
W. A. SCHAICH
ATTORNEYS

FIG. 16

INVENTOR.
WILLIAM A. STUTSKE

March 15, 1966  W. A. STUTSKE  3,240,582
METHOD FOR FORMING AND DELIVERING GLASS
Filed June 29, 1962  13 Sheets-Sheet 13

INVENTOR.
WILLIAM A. STUTSKE
BY
E. J. HOLLER &
W. A. SCHAICH
ATTORNEYS

United States Patent Office 3,240,582
Patented Mar. 15, 1966

3,240,582
METHOD FOR FORMING AND DELIVERING GLASS
William A. Stutske, Toledo, Ohio, assignor, by mesne assignments, to Owens-Illinois Glass Company, Toledo, Ohio, a corporation of Ohio
Filed June 29, 1962, Ser. No. 206,433
4 Claims. (Cl. 65—127)

This invention relates to glass machinery and particularly to apparatus for forming and delivering glass.

The invention is directed particularly to the problem of severing charges of glass and delivering the charges to the spindles of a machine of the type commonly known as a Westlake machine such as shown in the patent to Kadow, 1,527,556. In a Westlake machine as conventionally used, a reciprocating ram is utilized to draw a charge of glass from a body of molten glass and deliver the charge downwardly on the inverted spindles of the machine.

It is an object of the invention to provide an improved apparatus for pressing and delivering a charge of glass to a glass forming machine.

It is a further object of the invention to provide such an apparatus which permits rapid and accurate control of the position of each charge so that shear marks will not become a part of the finished article.

It is a further object of the invention to provide such an apparatus which is adapted for use particularly in the formation of products from low expansion glass such as borosilicate glass.

It is a further object of the invention to provide an apparatus wherein a change to form charges of different sizes can be readily made with a minimum of labor and expense.

Basically, the invention comprises gripping and pressing successive charges severed from a stream of molten glass as they fall by gravity by moving male and female formers horizontally inwardly to grip and press each charge, retaining the charge in the female former by vacuum and moving the female former horizontally while swinging it to bring the charge into overlying relationship with the continuously moving inverted spindle of the machine, and moving the female former downwardly and depositing the glass charge onto the spindle as the spindle and charge are moved in overlying relationship. The invention further includes gripping the charge along the periphery thereof after it has been deposited on the spindle and pressing from the underside mechanically to cool a predetermined portion of the underside of the charge and press the glass from the underside by means of a plunger. The charge is then blown to final shape in a mold by applying air through the plunger.

In the drawings:

FIG. 3 is a fragmentary part sectional plan view on an enlarged scale of a portion of the apparatus shown in FIG. 1.

FIG. 9 is a fragmentary sectional view on an enlarged scale taken along the line 9—9 in FIG. 1.

FIG. 15–A is a schematic diagram showing the vacuum air circuit used in the apparatus.

Figure 1:
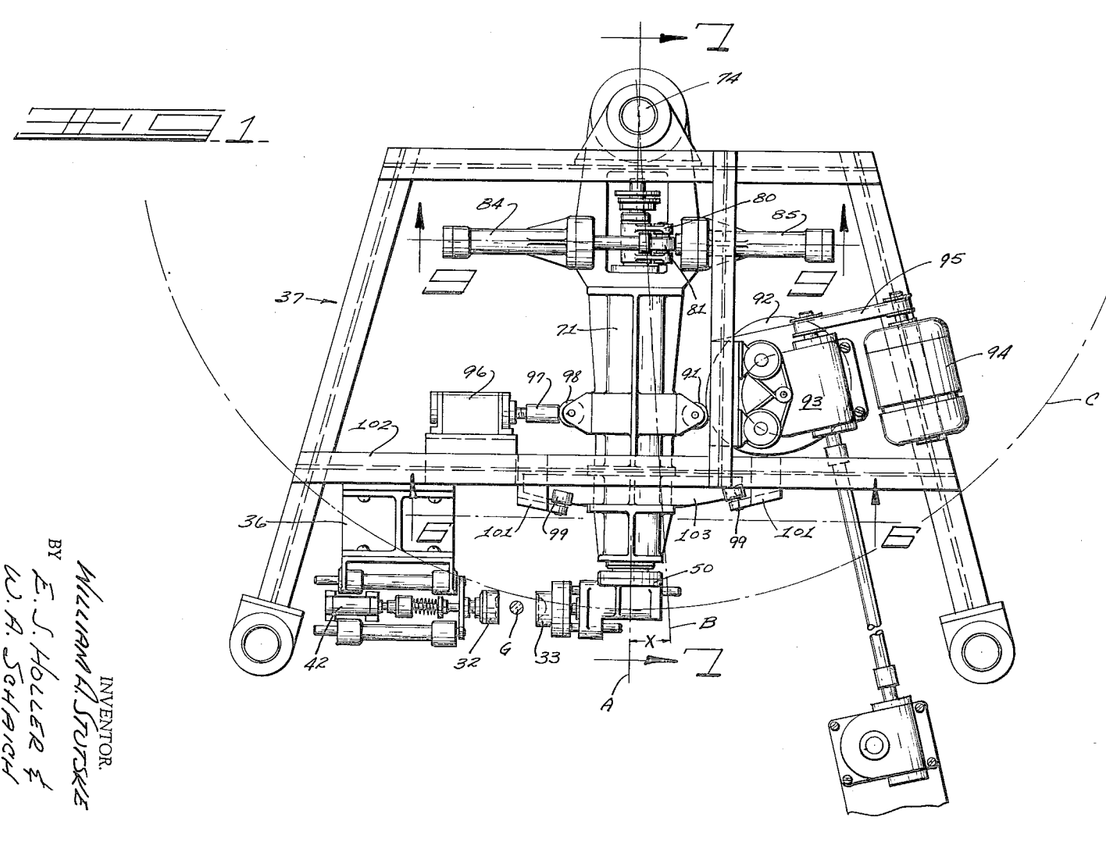
FIG. 1 is a fragmentary plan view of the apparatus embodying the invention.
Figure 2:
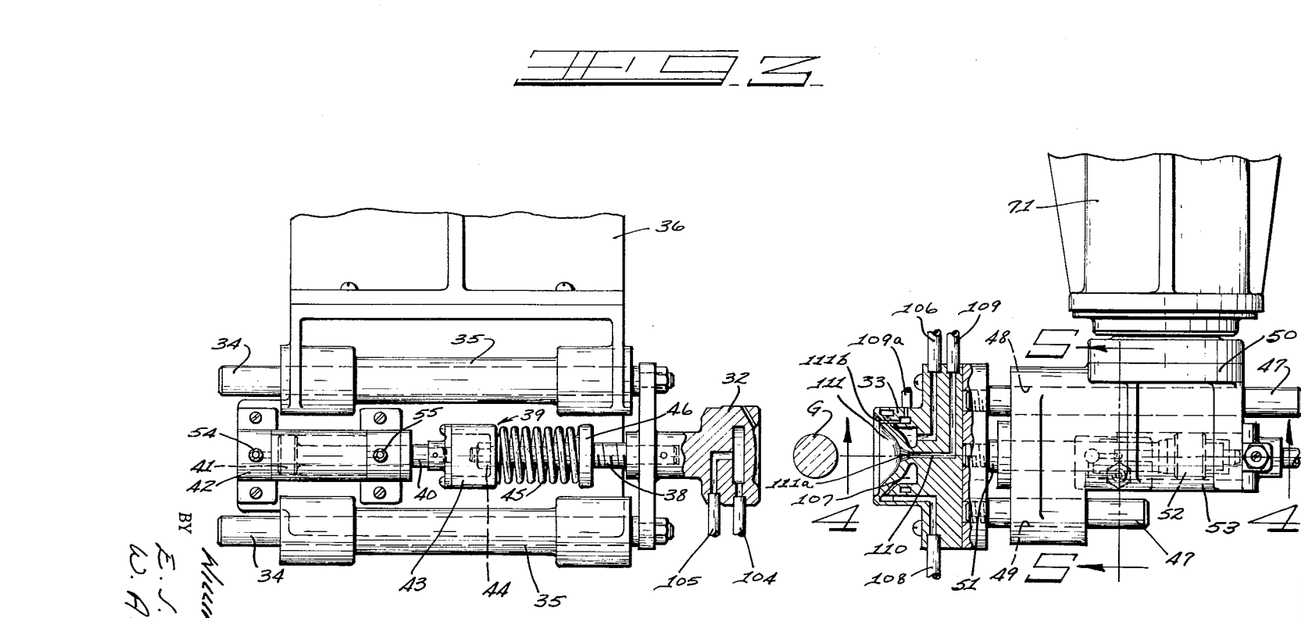
FIG. 2 is a fragmentary side elevation of the apparatus.

Referring to FIGS. 1 and 2, the apparatus embodying the invention is adapted to press a charge of glass G severed from a molten stream G fed from the feeder 30 and deliver it to the top of one of the spindles S on a machine such as a Westlake type machine shown in the aforementioned patent to Kadow. As presently shown, the spindles are preferably modified but may be of the type shown in the Kadow patent. It will be readily apparent to a person skilled in the art that the glass pressing and delivery apparatus may also be applied to other glass forming machines.

Referring to FIG. 1, the broken line C represents the circle about which the spindles S on the glass forming machine are moved during the operation of the machine. As further seen in FIG. 1, the stream of molten glass G moves downwardly adjacent the line C at one point. Shears 31 are then moved across the stream of molten glass G to sever successive charges. The shears are preferably in close proximity to the orifice of the feeder 30 and both the feeder and the shears may be of conventional design. Immediately after being severed, each charge of glass is gripped and pressed between male former 32 and female former 33 which are moved horizontally toward one another. As shown in FIG. 3, the male former 32 is mounted on rods 34 which are slidable in elongated bearings 35 which, in turn, are fixed to a bracket 36 mounted on the rigid frame 37 of the machine. A shaft 38 extends from the male former 32 to a yieldable connection 39 with a shaft 40 of a piston 41 of a hydraulic piston motor 42. The yieldable connection comprises a hollow member 43 on the piston shaft 40 through which the shaft 38 extends and a nut 44 threaded on the shaft 38. A coil spring 45 is interposed between the member 43 and a flanged member 46 fixed on the shaft 38 so that the spring 45 yieldingly urges the shaft 38 and, in turn, the male former 32 away from the piston shaft 40.

As shown in FIG. 3, the female former 33 is similarly mounted on rods 47 which are slidable in bearing openings 48, 49 of a support 50. The female former 33 is connected directly to a shaft 51 (FIG. 4) of a piston 52 operating in a hydraulic cylinder 53 within the support 50.

Figure 4:
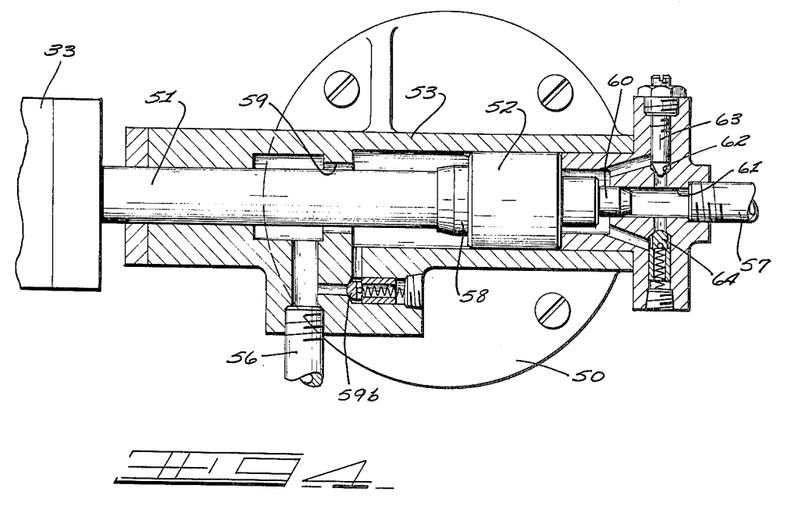
FIG. 4 is a fragmentary sectional view on an enlarged scale taken along the line 4—4 in FIG. 3.
Figure 5:
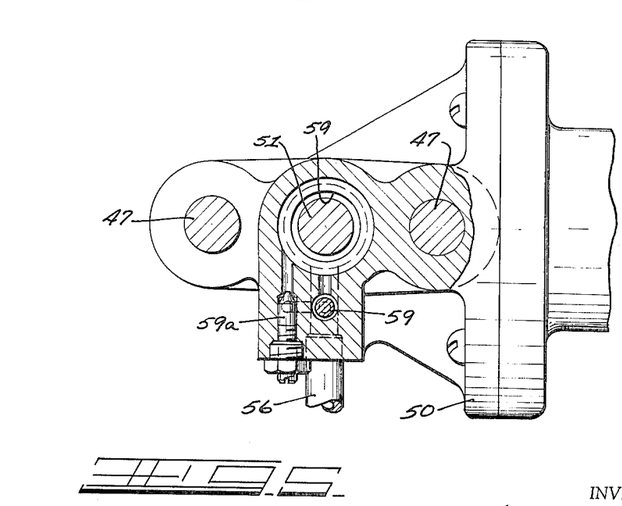
FIG. 5 is a fragmentary sectional view on an enlarged scale taken along the line 5—5 in FIG. 3.

Referring to FIG. 3, by supplying hydraulic fluid alternately to the conduits 54, 55, the male former 32 may be caused to be moved toward and away from the female former 33 to grip and press the charge of glass. Referring to FIG. 4, by applying hydraulic fluid alternately through conduits 56, 57, the piston 52 may be caused to move the female former inwardly and outwardly relative to the support 50 to press the charge of glass and, in addition, deliver the charge, as presently described. Piston 52 includes an ensmalled portion 58 which cooperates with a portion 59 of reduced cross section in the cylinder to restrict the flow of fluid out of the cylinder through adjustable restriction 59a (FIG. 5) as the female former 33 is moved outwardly. This restricting action combined with the check valve 59b produces the necessary throttling action to control the final outward movement of the female former 33. Similarly, a portion of reduced cross section 60 on the other end of the piston shaft 51 operates within an ensmalled portion 61 of the cylinder to restrict the flow of fluid through the outlet pipe 57 upon return of the former so that the fluid passes through an adjustable restriction 62 controlled by an adjustable member 63 and further controlled by a check valve 64.

Figures 7, 8:
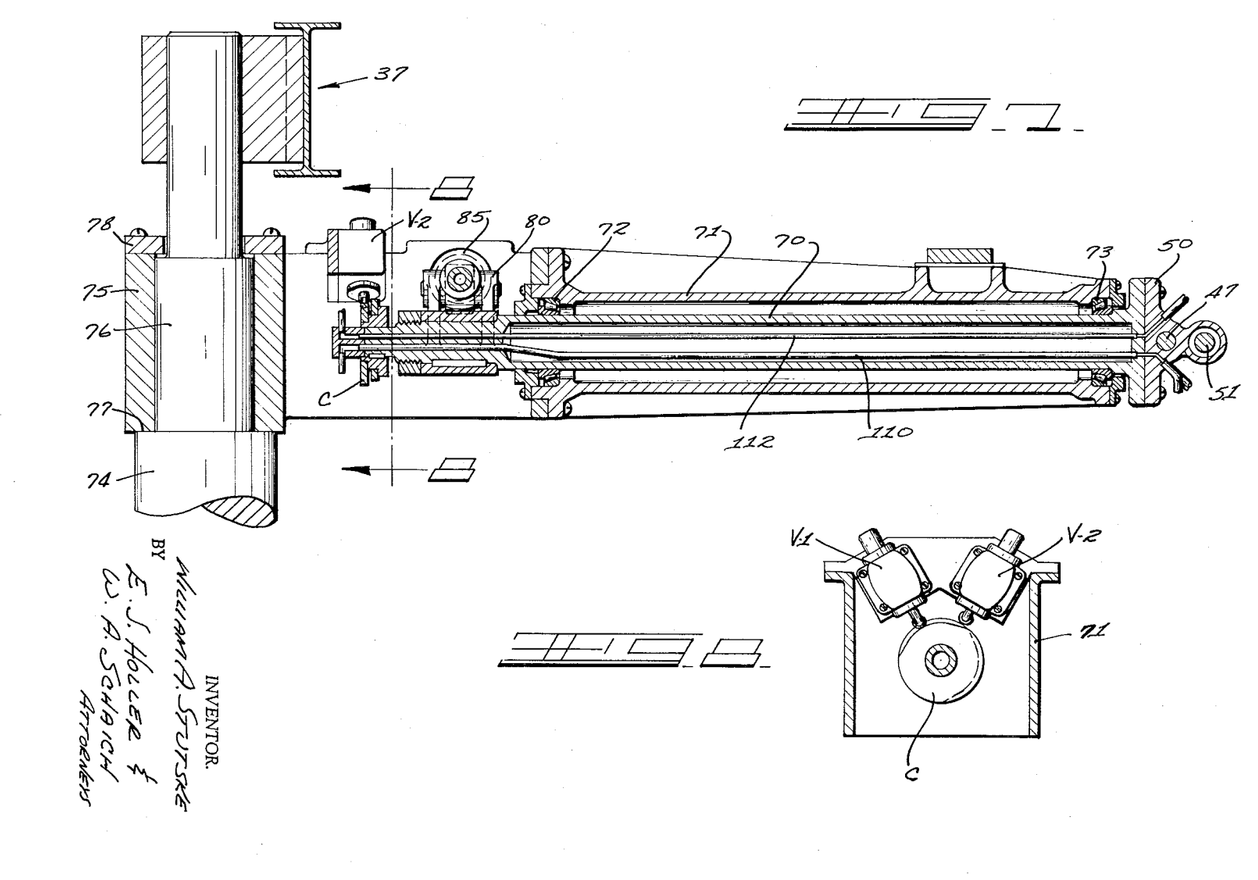
FIG. 7 is a fragmentary sectional view on an enlarged scale taken along the line 7—7 in FIG. 1.
FIG. 8 is a fragmentary sectional view taken along the line 8—8 in FIG. 7.

As previously indicated, the female former 33 is adapted to be moved horizontally and swung about a horizontal axis. As shown in FIG. 7, in order to achieve this movement, the support 50 is fixed on the end of a support arm 70 which is rotatably mounted in a frame arm 71 by bearings 72, 73. The frame arm 71 is mounted on a center post or column 74 for swinging movement substantially along the arc C (FIG. 1). Specifically, the arm 71 has a cylinder 75 formed on the inner end thereof which is telescoped over a reduced portion 76 of the column 74 and engages a shoulder 77 on the column 74. A cap ring 78 is fastened to the upper end of the cylinder portion 75. The rotational movement of support arm 70 in frame arm 71 is achieved by a yoke member 80 keyed to the support arm 70 and rotatably supporting a roller 81 (FIG. 9). The capped ends of opposed hollow pistons 82, 83 of hydraulic cylinders 84, 85 engage the roller to rotate the support arm 70 relative to the frame arm 71 through the yoke 80. Specifically, as shown in FIG. 9, fluid supplied through inlets 86, 87 controls the rotating action of support arm 70 and in turn support 50 which swings the female former 33.

Figure 6:
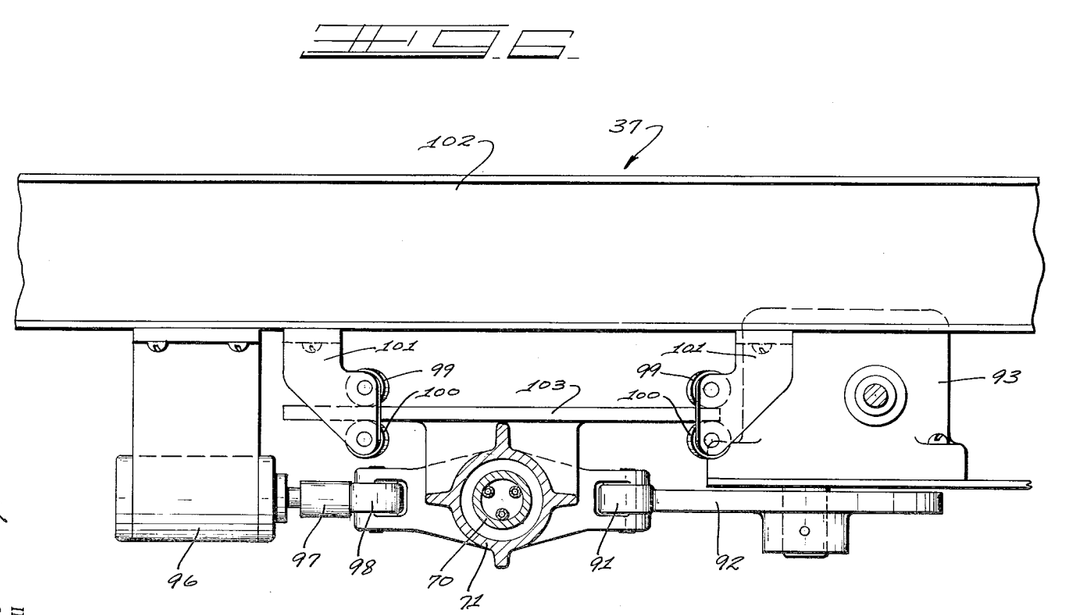
FIG. 6 is a fragmentary sectional view on an enlarged scale taken along the line 6—6 in FIG. 1.

As shown in FIG. 1, the frame arm 71 is adapted to be swung in a small arc X from a forming position A where the charge is gripped and pressed to a position B where the charge is delivered to the spindle between positions A and B. This motion is achieved by engagement of a roller 91 on the frame arm 71 with a cam 92 (FIG. 2) fixed on the shaft of a gear box 93 mounted on the frame 37 and driven by a motor 94 through a belt 95. The roller 91 on the frame arm 71 is maintained in engagement with cam 92 by a piston motor 96, the shaft 97 of which engages a roller 98 rotatably mounted on side of frame arm 71 opposite roller 91. The weight of the frame arm 71 and the members mounted thereon is rotatably supported adjacent its outer end by vertically spaced rollers 99, 100 (FIG. 6) mounted for rotation about horizontal axes on brackets 101 fixed to the cross arm 102 of frame 37 and engaging the top and underside, respectively, of a plate 103 fixed on frame arm 71. When cam 92 is rotated the arm 71 is swung back and forth through an arc X between forming position A and maximum position B (FIG. 1).

As shown in FIG. 3, liquid coolant is preferably applied to male former 32 through inlet 104 and removed through outlet 105 to maintain the temperature of the male former uniform. Similarly, liquid coolant is supplied to female former 33 through inlet 106 and extends through passages 107 to outlet 108. Vacuum is supplied to the female former 33 through an inlet 109 to a passage 110 communicating with the openings 111a in the base of the cavity 111 of the female former 33 and through an inlet 109a to the openings 111b in the periphery of the cavity 111. As shown in FIG. 7, the liquid for cooling to the two formers is supplied through the support arm 70 by a liquid coolant tube 110. Similarly, a vacuum tube 112 extends through the support arm 70 to connect with the vacuum inlet 109. A similar tube, not shown, connects with the vacuum inlet 109a. Vacuum is supplied through inlets 109, 109a to openings 111a, 111b to retain the pressed charge in the female former 3. When it is desired to deposit the charge on the spindle S, as presently described, openings 111a are vented to the atmosphere through inlet 109 and air under pressure may be supplied to openings 111b through inlet 109a. The movements of the various mechanisms heretofore described are controlled in order to produce the desired function of gripping and pressing a charge of glass and transferring it to the spindle.

Figure 10:
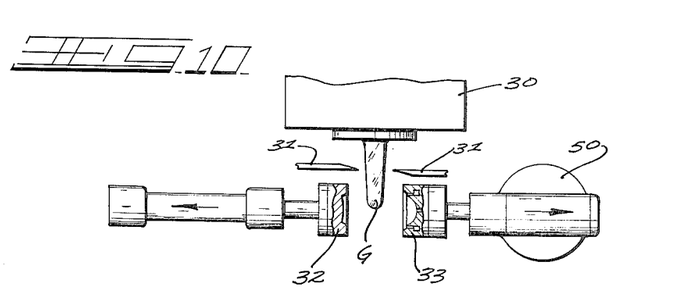
FIGS. 10–14 are partly diagrammatic views showing the relative positions of the molten stream, shears and male and female formers and spindle during the forming and delivery of a charge of glass.
Figure 11:
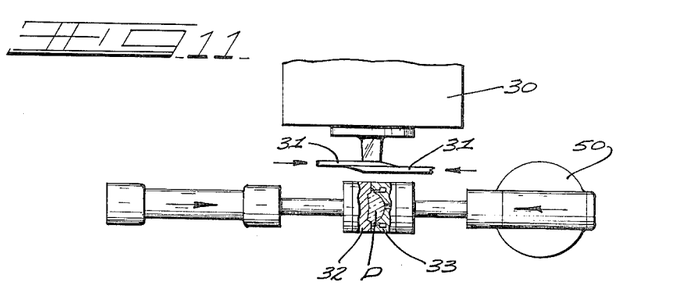
Figure 12:
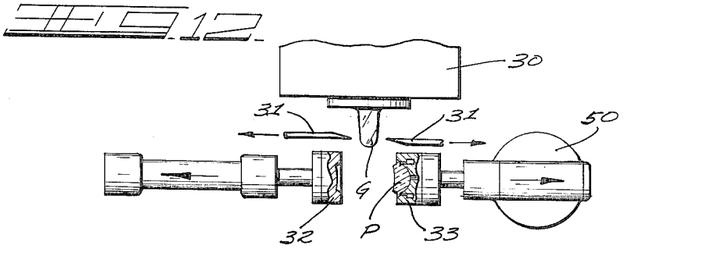

The relative movements and relationship of the various parts is shown in partly diagrammatic fashion in the drawings in FIGS. 10–14. Referring to FIG. 10, as a continuously moving stream G of molten glass is delivered downwardly from the feeder 30, the shears 31 operate to successively sever charges of glass from the stream (FIG. 11). Immediately upon being severed, a charge is gripped between the male former 32 and female former 33 by actuation of their respective cylinders and pressed into shape to form the shaped charge P. The male former 32 and female former 33 are then moved apart, vacuum being applied to the female former 33 to retain the shaped charge P in the female former (FIG. 12). In the meantime, the shear blades 31 have been moved away from the orifice and the glass G continues to move downwardly to form the next charge.

During the formation of the shaped charge by the male former 32 and female former 33, the formers are moved toward one another in a positive fashion by their respective cylinders. During the final movement, the spring 45 forming the resilient connection between the male former 32 and its respective piston shaft 40 is compressed slightly to insure a positive clamping of the two formers together.

Figure 13:
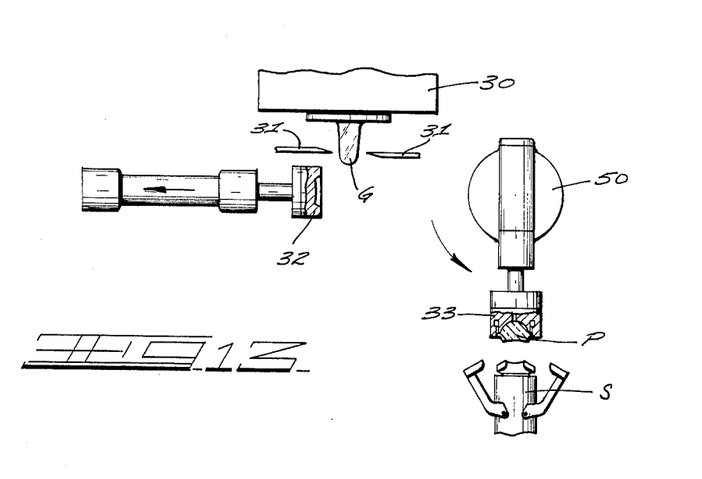
Figure 14:
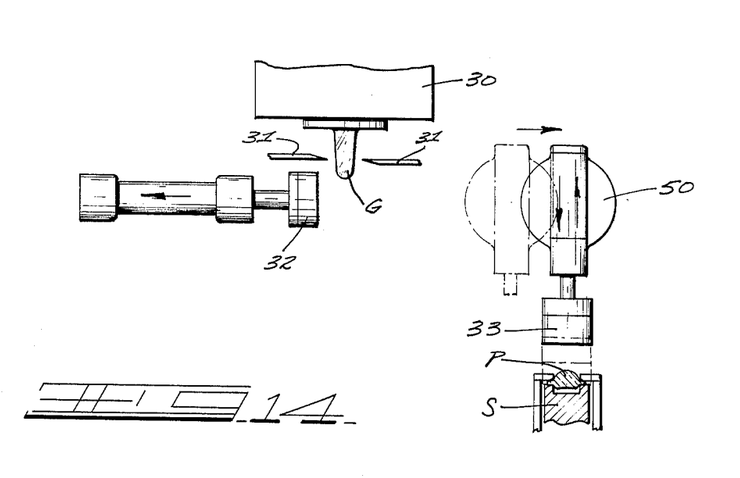

The female former 33 with the formed charge P therein, as shown in FIG. 12, is then retracted with respect to its cylinder and the support 50 is moved horizontally by swinging movement of the arm 71 and simultaneously swung about a horizontal axis to bring the shaped charge P into overlying relationship with a spindle S (FIG. 13). The spindle S and the arm 71 supporting the female former 33 are, at that time, continuously moving so that their paths overlie one another and the female former 33 is then moved downwardly by actuation of its respective cylinder and the vacuum released to deposit the shaped charge P onto the top surface of the spindle S where it is clamped in position by the clamping members, as presently described (FIG. 14).

The female former 33 is retracted before frame arm 71 reaches position B. The frame arm 71 is then swung back to its original position and, at the same time, female former 33 is swung to its horizontal position for cooperation with the male former 32 in order to grip the next successive charge. Thus, the male former 32 and female former 33 cooperate to grip each charge and shape it and the female former 33 then moves laterally and swings to deposit the shaped charge on a spindle.

Figure 15:
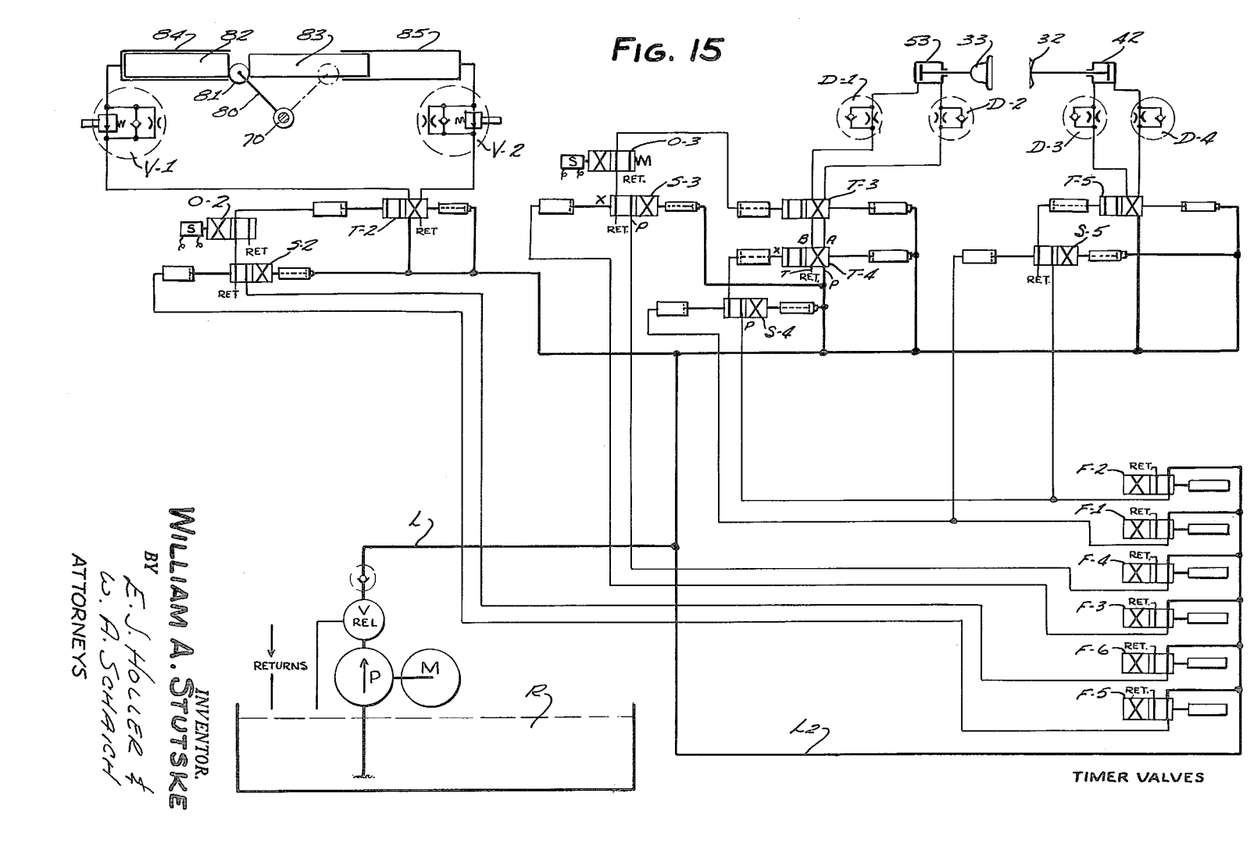
FIG. 15 is a schematic diagram showing the hydraulic circuit for operating the apparatus.
Figure 16:
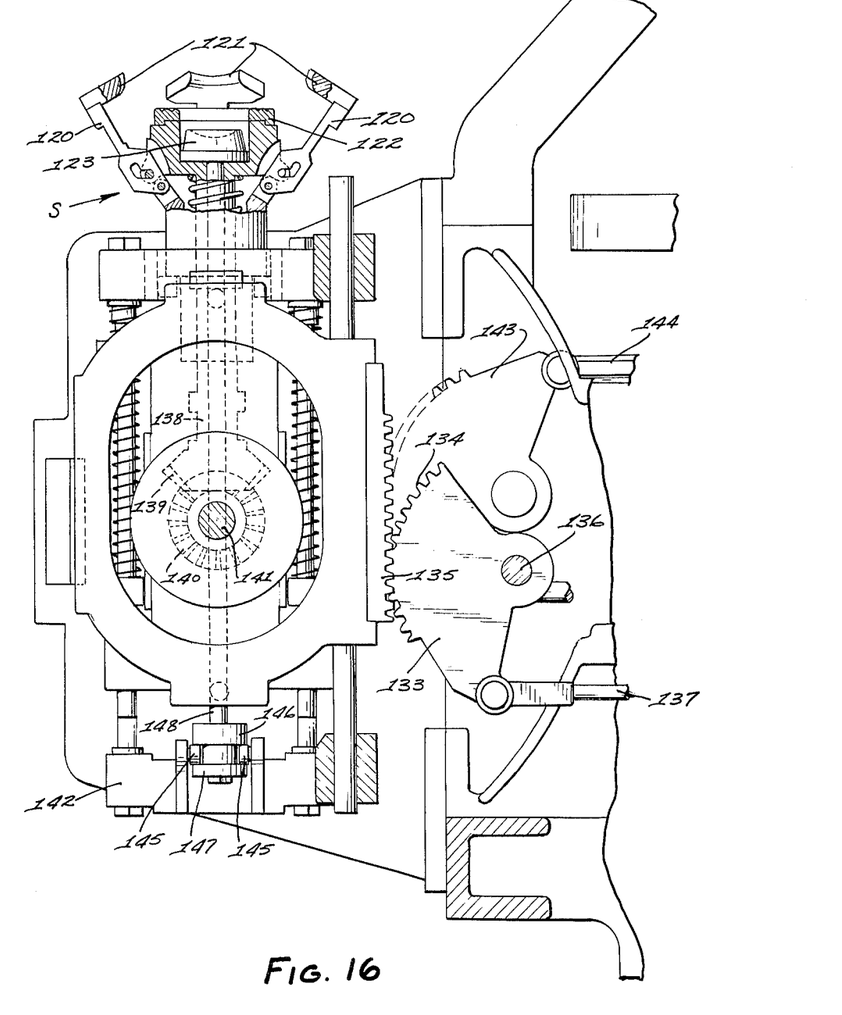
FIG. 16 is a part sectional elevation through a spindle of the glass forming machine to which a charge of glass is delivered.

Referring to FIG. 15 which is a diagrammatic showing of the hydraulic circuit operating the male and female former cylinders 42, 53 and the cylinders 84, 85 for swinging the female former 33, the operation of these cylinders is controlled by four-way valves. Specifically, four-way T–2 controls the flow of fluid to and from cylinders 84, 85, four-way valves T–3, T–4 control the flow of fluid to and from cylinder 53 and four-way valve T–5 controls the flow of fluid to and from cylinder 42. Hydraulic fluid is supplied to each of the fourway valve units T–2, T–3, T–4 and T–5 from a pump P driven by a motor M which takes hydraulic fluid from a reservoir R and supplies it through a line L to the four-way valve units.

The movement of each four-way valve unit is, in turn, controlled by a smaller four-way valve, valves S–2, S–3, S–4 and S–5 being provided, respectively, for valves T–2, T-3, T-4 and T-5. The operation of the smaller four-way valves is, in turn, controlled by timer valves mounted adjacent to a timer drum which is operated in timed relationship to the movement of the spindles of the glass forming machine, the swinging action of the frame arm 71 and the operation of the shears. The timer valves are shown on the right in FIG. 15 and fluid is supplied to these valves from the pump through lines L and $L_2$.

The female former cylinder 53 is operated through two four-way valves in series, T-4 which controls the form function and T-3 which controls the load function. These valves are of the pilot differential type having full pressure always against one end. Each of these valves is controlled by another smaller four-way valve of the same type. S-4 controlling T-4 and S-3 controlling T-3, and these are, in turn, controlled by the timer valves. At the start of a typical cycle, the valve spools and flow pattern is as shown on the diagram. Timer valve pilot pressure is on "X" and "P" of valves S-4 and S-3. Timer pilot valve F-1 is the first to operate. It is shifted by the cam and permits pressure to drop off of "X" on valve S-4. This allows pressure to go through S-4 from "P" to "B" and to "X" of valve T-4, shifting the spool of that valve which then passes pressure from port "P" to "A" and on through valve T-3 to the rear of the cylinder.

When the form stroke is completed, the timer pilot valve F-2 is operated and pressure in this pilot line drops off allowing the spool of T-4 to shift back to its original position and causing the cylinder rod to retract. At this point, the line from "X" of T-4 has no pressure but goes to tank through valve S-4 "B" to "P" and through the timer pilot valve. The timer valve F-1 is then operated to return it to its normal starting position again. This puts pilot pressure on "X" of S-4 shifting this valve back to its starting position but does not change the flow conditions in S-4 because port "B" was to tank through port "P" and after the spool shifts "B" is to tank through port "T." Port "P" of valve S-4 is then to "A" which is blocked and timer pilot valve F-2 is operated, putting pressure back on port "P." The system has thus been reset and is ready for the next cycle. It should be noted that both the female and male form strokes are operated from the same two timer valves, as they operate at the same time. After the forming of the blank and the 90° swing down of the female form cylinder, valves S-3 and T-3 are used to operate this cylinder for the blowhead load stroke, the sequence of operation being the same. Valve O-3 is a safety valve which prevents the load stroke whenever the machine is out of synchronization with the former. A similar safety valve O-2 is provided in the circuit for controlling the swinging of female former 33.

Timer valves F-3, F-4 control the extension and retraction of the female former cylinder when it is vertical to deposit the charge on the spindle. Timer F-5, F-6 control the swinging and return of the female former from the horizontal to the vertical position and back. Deceleration valves V-1, V-2 are provided in association with cylinders 84, 85, respectively, for controlling the action of the cylinders. As shown in FIG. 8, these valves are mounted on frame arm 71 and include plungers which engage a cam C which is movable with support arm 70. Adjustable flow control valves D-1, D-2 are provided in association with cylinder 53 and flow control valves D-3, D-4 are provided in association with cylinder 42 for controlling the speed of movement of these cylinders.

Referring to FIG. 15-A, timer valve F-7 is operable periodically to selectively control the application of air under pressure or vacuum to the peripheral openings 111b and female former 33. Similarly, timer valve F-8 is operable periodically to selectively control the application of vacuum to the central opening 111a of the female former 33 or the venting of the central opening 111a to atmosphere.

The operation of the hydraulic and air circuit may be summarized as follows:

The male former 32 and female former 33 are located just below the shears, one on either side of the gob and about 3" from the centerline of the orifice. As the gob is sheared, the formers 32, 33 move together, catching the gob and pressing it to form the blank. As the formers 32, 33 move together, vacuum is applied to the female former cavity 111 through the small holes 111a in the dome and the small holes 111b in the rim. This is initiated by the drum timer. The formers 32, 33 then reverse and the formed blank is held in the female former.

When the female former 33 has retracted, it swings down 90° into vertical position, and at that time is approximately over a spindle S. The machine is rotating counterclockwise and as the female former 33 reaches its vertical position, the arms on which it is mounted also start to move counterclockwise about the center of the machine. The former arm 71 thus follows the machine for about 2¼° of machine rotation. This motion is by cam 92 which makes one revolution per machine blowhead. During this follow period, the female former cylinder is operated again so that the former 33 moves down close to the spindle S. The vacuum is turned off as the former approaches the spindle and the small holes 111a in the dome of the female former cavity are vented to atmosphere. Air pressure is briefly applied to the peripheral holes 111b, thus forcing the blank to drop out onto the blowhead. The former 33 then retracts upward and the arm on which the female former cylinder is mounted is cammed back clockwise to its rest position. As it moves back, the female former assembly swings up 90° bringing it horizontal and ready for the next form stroke.

Figure 19:
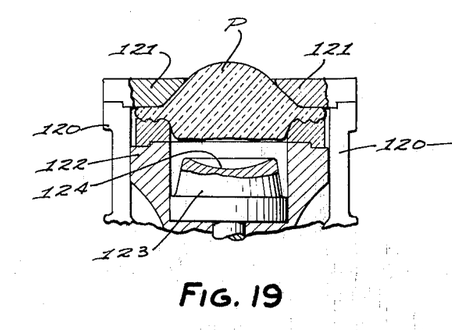
FIG. 19 is a fragmentary view similar to FIG. 18 showing the charge after it has been clamped around its periphery on the spindle.
Figure 20:
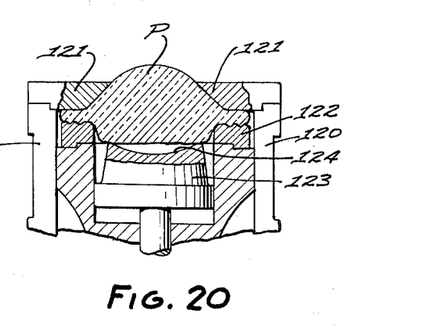
FIG. 20 is a view similar to FIG. 19 showing the charge after it has been subjected to mechanical pressure from the underside thereof.

As shown in FIGS. 16-20, each spindle S includes a plurality of arms 120 having arcuate clamping portions 121 on their upper ends that are adapted to close upon the periphery of the support 122 of the spindle S to grip the periphery of a charge of glass as shown in FIG. 19. After the periphery is gripped, a plunger 123 is moved upwardly bringing the periphery 124 thereof into contact with the periphery of the underside of the charge to chill the charge without substantial reshaping thereof. As shown in FIG. 19, the top surface 124 of the plunger 123 is concave so that only the periphery of the underside of the charge is chilled. The degree of contact of the periphery of the plunger 123 with the underside of the charge determines the degree of chilling which, in turn, controls the amount of glass that is blown upwardly by introduction of air through opening 25 during the subsequent forming operations after the spindle is reverted and a mold is closed about the charge.

Figures 17, 18:
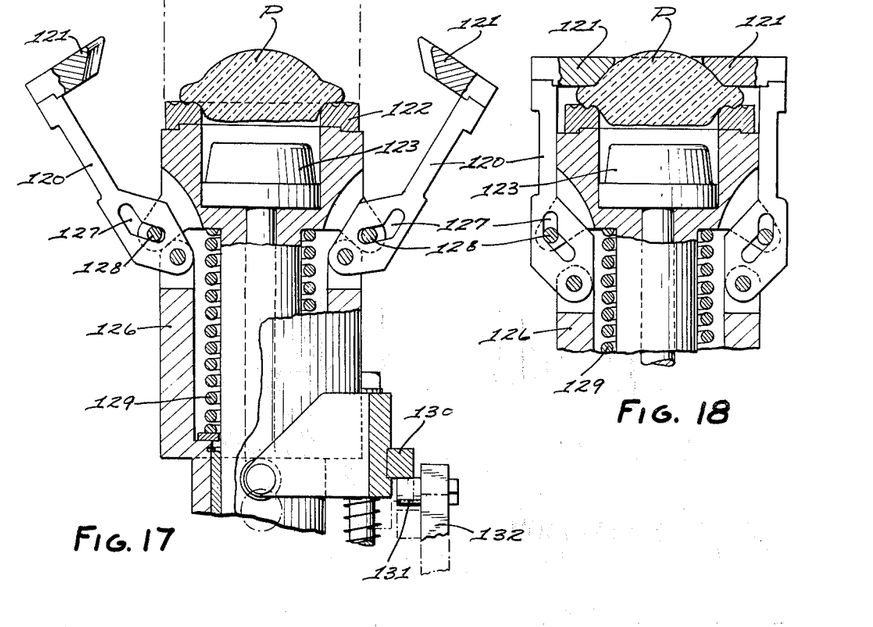
FIG. 17 is a fragmentary radial vertical section through a spindle to which a charge of glass has been delivered.
FIG. 18 is a fragmentary sectional view similar to FIG. 17 showing the charge as it is about to be clamped around its periphery on the spindle.

The manner in which the arms 120 are opened and closed and the plunger 123 is operated forms no part of the present invention and any convenient means can be used. As shown in FIGS. 16-20, the arms 120 are pivoted on a sleeve 126 which is slidable upwardly and downwardly on the spindle 122. A spring normally yieldingly urges the sleeve 126 downwardly. Each arm includes an angularly shaped slot 127 riding on a pin 128 on the spindle 122. When the sleeve 126 is yieldingly urged downwardly by the spring 129, the pins ride in the slots 127 causing the arms to close (FIG. 18). The control of the movement of the sleeve 126 is achieved by engagement of a block 130 thereon with a pin 131 of a yoke 132 mounted on the side of the machine and adapted to be actuated by a sector 133 having teeth 134 engaging with the rack 135 on the yoke. The sector 133 is pivoted about its axis 136 by a lever 137. The spindle, in turn, is rotatably mounted and has a shaft 138 formed with a bevel gear 139 engaging a bevel gear 140 on a drive shaft 141. Rotation of the drive shaft 141, in turn, causes rotation of the spindle S during the forming of the glass article. Inversion of the spindle from the upright position shown in FIG. 16 to a downward position (not shown) merely causes the gear 139 to track on the gear 140 still permitting the rotating action of the gear.

The movement of the plunger 123 upwardly and downwardly relative to the support 122 is achieved by a similar yoke 142 that is actuated by a gear sector 143 engaging teeth thereon (not shown) and actuated by a lever 144. The yoke includes a pair of pins 145 which engage shoulder projections 146, 147 on the shaft 148 fixed to the plunger. Any other convenient means for opening and closing the arms 120 and operating the plunger 123 can be used.

The important feature of the spindle construction is the arrangement utilizing a plunger that will peripherally contact and chill the underside of the charge in such a manner that the amount of glass to be blown out through the center of the charge is controlled. A greater degree of chilling will result in a lesser amount of glass blown out. In this manner, the distribution and weight of the glass article can be accurately controlled.

I claim:

1. The method of forming and delivering glass which comprises
   directing a stream of molten glass downwardly,
   severing a charge of glass from said stream of molten glass and permitting it to fall freely under the action of gravity,
   pressing said charge of glass immediately after severing to a desired form after it has been severed while it is under the action of gravity by moving male and female formers laterally to grip and press the charge of glass,
   moving the male former away from the charge,
   retaining the charge of glass in the female former,
   moving the female former laterally and rotating the female former to bring the charge of glass into overlying relationship with a moving head,
   depositing said charge of glass downwardly onto the moving head while the head continues to move,
   gripping said charge about its periphery on said head,
   and momentarily causing a plunger to move upwardly against the peripheral portion of the underside of said charge to preferentially cool the underside of the charge.

2. The method of forming and delivering glass which comprises
   moving a plurality of heads continuously and successively in a predetermined path adjacent a forming station,
   feeding a stream of molten glass continuously downwardly at said station,
   severing successive charges of glass from said stream of molten glass and permitting each charge to fall freely under the action of gravity,
   moving male and female formers horizontally toward one another to grip and press each falling molten charge as it moves by gravity after having been severed,
   moving said male and female formers relatively apart,
   retaining each pressed charge in the female former,
   moving the female former laterally and rotating said former to bring the charge into overlying relation with a moving head,
   depositing the charge on the moving head by moving the female former downwardly into proximity with the moving head and then releasing the charge,
   returning the female former for gripping of a succeeding charge,
   clamping the periphery of each charge which has been deposited on a head,
   and momentarily causing a plunger to move upwardly against the peripheral portion of the underside of said charge to preferentially cool the underside of the charge.

3. The method of forming and delivering glass which comprises
   directing a stream of molten glass downwardly,
   severing a charge of glass from said stream of molten glass and permitting it to fall freely under the action of gravity,
   moving male and female formers laterally to grip and press the falling charge of glass,
   moving the male former away from the charge,
   retaining the charge of glass in the female former,
   moving the female former laterally and rotating the female former to bring the charge of glass into overlying relationship with a moving head,
   and depositing said charge of glass onto the moving head while the head continues to move.

4. The method of forming and delivering glass which comprises
   moving a plurality of heads continuously and successively in a predetermined path adjacent a forming station,
   feeding a stream of molten glass continuously downwardly at said station,
   severing successive charges of glass from said stream of molten glass and permitting each charge to fall freely under the action of gravity,
   moving male and female formers horizontally toward one another to grip and press each falling molten charge as it moves by gravity after having been severed,
   moving said male and female formers relatively away from one another,
   retaining each pressed charge in the female former,
   moving the female former laterally and rotating said former to bring the charge into overlying relation with a moving head,
   depositing the charge on the moving head by moving the female former downwardly into proximity with the moving head and releasing the charge,
   and returning the female former for gripping of a succeeding charge.

References Cited by the Examiner

UNITED STATES PATENTS

| | | | |
|---|---|---|---|
| 1,413,788 | 4/1922 | Rule | 65—304 X |
| 1,446,649 | 2/1923 | Lents | 65—303 |
| 1,712,327 | 5/1929 | Brooke | 65—303 |
| 1,778,735 | 10/1930 | Soubier | 65—224 |
| 1,843,178 | 2/1932 | Soubier | 65—127 X |
| 1,949,887 | 3/1934 | Soubier | 65—221 X |
| 2,263,127 | 11/1941 | Gray | 65—127 X |
| 2,433,013 | 12/1947 | Ziegler | 65—146 |
| 2,669,806 | 2/1954 | Van de Walle et al. | 65—224 |

FOREIGN PATENTS 1,021,190  11/1952  France.

DONALL H. SYLVESTER, *Primary Examiner.*